(12) United States Patent
Lee et al.

(10) Patent No.: US 6,687,291 B1
(45) Date of Patent: Feb. 3, 2004

(54) TIME-DOMAIN EQUALIZER OF CASCADED FILTERS FOR VDSL

(75) Inventors: Hoon Lee, Chollabuk-do (KR); Tae Whan Yoo, Taejon (KR); Jung Hak Kim, Chollabuk-do (KR); Jeong Jin Lee, Taejon (KR)

(73) Assignee: Electroincs and Telecommunications Research Institute, Taejon (KR)

( * ) Notice: Subject to any disclaimer, the term of this patent is extended or adjusted under 35 U.S.C. 154(b) by 0 days.

(21) Appl. No.: 09/498,318

(22) Filed: Feb. 4, 2000

(30) Foreign Application Priority Data

Dec. 27, 1999 (KR) .................................... 1999-62432

(51) Int. Cl.[7] .............................................. H03H 7/30
(52) U.S. Cl. ..................................................... 375/229
(58) Field of Search ................................. 375/229, 230, 375/235, 222, 224, 232, 231; 708/322, 323, 300

(56) References Cited

U.S. PATENT DOCUMENTS

| | | | | |
|---|---|---|---|---|
| 5,285,474 A | | 2/1994 | Chow et al. ................... | 375/13 |
| 6,219,378 B1 | * | 4/2001 | Wu ................................ | 375/231 |
| 6,353,629 B1 | * | 3/2002 | Pal ................................. | 375/222 |
| 6,408,022 B1 | * | 6/2002 | Fertner ......................... | 375/230 |
| 6,526,105 B1 | * | 2/2003 | Harikumar et al. ........... | 375/350 |

OTHER PUBLICATIONS

Al–Dhahir and Cioffi, "Optimum Finite–Length Equalization for Multicarrier Transceivers," *IEEE Transactions on Communications*, 44(1):56–64, Jan. 1996.

Al–Dhahir et al., "Stable Pole–Zero Modeling of Long FIR Filters With Application to the MMSE–DFE," *IEEE Transactions on Communications*, 45(5):508–513, 1997.

Chow and Cioffi, "A Cost–Effective Maximum Likelihood Receiver for Multicarrier Systems," *ICC '92*, pp. 948–952, 1992.

Melsa et al., "Impulse Response Shortening for Discrete Multitone Transceivers," *IEEE Transactions on Communications*, 44(12):1662–1672, 1996.

* cited by examiner

*Primary Examiner*—Khai Tran
(74) *Attorney, Agent, or Firm*—Seed IP Law Group PLLC

(57) ABSTRACT

Method for designing TEQs(Time-domain Equalizers) for different signal bands in a VDSL transmission system, including the steps of dividing an entire signal band into at least two signal bands, and respectively modulating the divided signal bands before transmission at a transmitter, and applying respective transmitted signal bands to an algorithm that can reduce channel response lengths of the respective signal bands at a receiver, for obtaining respective TEQs, and connecting the TEQs in series, wherein an entire signal band is divided into a low frequency signal band and a high frequency signal band, with the low frequency signal band allocated smaller than the high frequency signal band, and preferably the low frequency signal band includes the signal band used in an ADSL, whereby reducing an amount of hardware and assuring an interchangeability with the ADSL transmission system.

9 Claims, 3 Drawing Sheets

TIME-DOMAIN EQUALIZER OF CASCADED FILTERS FOR VDSL

TECHNICAL FIELD

The present invention relates to a VDSL transmission system of DMT(Discrete Multi-Tone) modulation/demodulation scheme, and more particularly, to a time-domain equalizer of cascaded dual filter in a VDSL transmission system which is adapted to maintain interoperability with an ADSL transmission system.

BACKGROUND OF THE INVENTION

FIG. 1 illustrates a functional block diagram showing a transmitter and a receiver of a DMT transmission system. Core technologies in the DMT transmission system is the RS coding, the TCM(Trellis Coded Modulation), the bit loading, the TEQ(Time-domain Equalizer), the FEQ (Frequency-domain Equalizer, and modulation and demodulation by using the IFFT(Inverse Fast Fourier Transform) and the FFT.

The operation of the modulation/demodulation device(a modem) using the Fourier Transform will be described.

A frequency domain DMT symbol $X=[X_0, X_1, ---, X_{N-1}]^T$ has N complex QAM symbols, wherein each of the QAM symbol forms a subchannel to form total N subchannels. An (n)th QAM symbol Xn[an (n)th subchannel symbol] is modulated with a digital carrier $P_n=[1, e^{jwn}, e^{j2wn}, ---, e^{j(N-1)wn}]^T$ having a length N and a frequency $\omega_n=2\pi n/N$. Therefore, (m)th DMT symbol may be represented as $X_m=[X_{m,0}, X_{m,1}, ---, X_{m,N-1}]^T$, wherein, if an N number of QAM symbols are modulated with digital carrier and $X_{m,k}$ value at time k is calculated, $X_{m,k}=X_{m,0}*P_{0,k}+X_{m,1}*P_{1,k}+---+X_{m,N-1}*P_{N-1,k}$ is obtained, where $P_{n,k}=e^{jkwn}$ of a carrier $P_n$ at time k. That is, it can be known that $X_{m,k}$ is a (k)th signal obtained by subjecting $X_m$ to Fourier transform. Accordingly, a DMT modem can modulate N QAM symbols(N subchannel symbols) at a time by using N point inverse Fourier transform. Alikely, transmitted symbols can be demodulated by using the N point Fourier transform at a receiver terminal. In the DMT modulation/demodulation type transmission system, since the modulated signal is transmitted through a baseband, a resultant of a Fourier transform of the N sub-channel symbols at the transmitter should be a real value. For this, the N point IFFT at the transmitter is required to have a Hermitian symmetry characteristic of $X_{m,n}=X^*_{m,N-n}$, making only N/2 QAM symbols available actually for transmission after the modulation using the N point IFFT.

Once the DMT symbol $X_m=[X_{m,0}, X_{m,1}, ---, X_{m,N-1}]^T$ modulated at the transmitter passes a digital equivalent channel of v+1 impulse response length, it induces an ISI(Inter-Symbol Interference) to the following DMT symbol $X_{m+1}$, which can be eliminated as follows. That is, a CP(Cyclic Prefix) with a length v, i.e., $X_m=[X_{m,0}, X_{m,1}, ---, X_{m,N-1}]^T$ is added in front of the DMT symbol $x_m$ to provide a symbol with a length N+v before transmission from the transmitter, and a guard time for giving up the first v signals is used at the receiver. In this instance, it is required at the receiver that an impulse response length of entire channel inclusive of a linear filter and a transmission line should made to be equal to, or below v+1, which is the CP length plus 1, by employing a fixed linear filter. The linear filter used in this instance is called as a TEQ(Time-domain Equalizer).

At the receiver, the CP is removed from the N+v numbers of signals passed through the TEQ, and the transmitted symbols are demodulated by using the Fourier transform, to obtain $[X_{m,N-1}, X_{m,N-2}, ---, X_{m,N-1}]^T$, which is in a form of multiplication of transmission signals and transmission lines, at an (n)th subchannel in an (m)th DMT symbol if there is no noise on the transmission line. The Hn denotes a response at a channel frequency $\omega_n=2\pi n/N$, a frequency characteristic of (n)th subchannel. The subchannel frequency characteristic is by using an FEQ(Frequency-domain Equalizer), which has one complex tap that is adaptively renewed by using the LMS(Least Mean Square) algorithm, to form an inversion of a transmission function of the transmission line on the whole. By doing so, an identical determination circuit can be made available at the receiver for entire subchannels, but without any enhancement of the performance.

FIG. 2 illustrates a functional block diagram showing a system of the time-domain equalizer in FIG. 1.

As described before, in the transmission system employing the TEQ, an impulse response length of entire channel is limited to v+1 by using the TEQ, and, in order to obtain a linear filter w(D), which is the TEQ, a system as shown in FIG. 2 is used. And, once an optimal value of the linear filter is obtained by using the system, only w(D) is used in actual data transmission.

Referring to FIG. 2, it can be known that, in the DMT transmission system, a transmitter output signal at an initial stage x(D) passes through a transmission filter p(t) 21, a receiver match filter p*(−t) 23, and a TEQ w(D) 25, and on the same time, through an object filter b(D) 27. A subtracter 26 subtracts a signal from the TEQ 25 from the signal from the object filter 27, to provide a difference that is an error signal "e(D)=x(D)b(D)−y(D)w(D)". The object filter b(D) is an adaptive linear filter having a (v+1) number of taps.

The error signal e(D) of the TEQ obtained thus should be minimized, by means of algorithms, such as MMSE-DFE (Minimum Mean Square Error-Decision Feedback Equalizer) method, LS(Least Square) method, Eigen Value method, and the like, and modified versions of the foregoing methods for easy implementation of the methods. When the error is minimized by using the above algorithm, an entire transmission function of the transmission filter p(t) 21, the receiver match filter p*(−t) 23, and the TEQ w(D) 25 has a (v+1) number of impulse responses, thereby the DMT modulated symbol $X_m$ giving no ISI to a following symbol $X_{m+1}$. Thus, by obtaining an optimal TEQ by using a given algorithm and fixing a tap on the obtained TEQ, initialization of the TEQ is completed.

In this instance, though impulse responses of the object filter b(D) are limited to v+1, impulse responses of the TEQ w(D) 25 are not limited to v+1. Particularly, provided a number of subchannels used in the DMT transmission system increases, and a sampling frequency of a digital to analog converter and an analog to digital converter increases along with an increase of entire signal band, a length of digital equivalent impulse response of a channel having a length of time fixed physically increases. In this instance, a number of taps of the TEQ should be increased along with an increase of a size of the subchannel, for limiting impulse responses of entire channels to v+1, effectively.

The TEQ in an ADSL(Asymmetric Digital Subscriber Line) transmission system employs an FIR filter of approx. 25 taps. However, since a transmission system having maximum 4096 subchannels and a maximum sampling rate of 35.328 MHz, such as VDSL, is involved in an increase of hardware complexity as the number of subchannels increases, and has an overall operation speed increase, that impedes implementation of the TEQ by using the aforementioned method, it is required to reduce a number of taps of the TEQ, effectively.

As described, besides the problem of the hardware complexity in implementation of the TEQ in a VDSL transmission system, the VDSL transmission system has a problem of interchangeability with the ADSL transmission system. That is, the VDSL transmission system should be capable of accepting even a case when the transmitter or the receiver has the ADSL transmission system, for which the VDSL transmission system is required to maintain the TEQ system that the ADSL transmission system uses for maintaining interchangeability with the ADSL transmission system without addition of separate hardware. However, a system having the ADSL class TEQ applied to the VDSL transmission system as it is either can be used, not for a VDSL rate data transmission, but only for an ADSL rate data transmission merely, or has an operation speed of the linear filter increased for use in the VDSL rate data transmission. However, the increase of the operation speed of the linear filter for using the system in the VDSL rate data transmission is difficult to implement because, as described before, the entire impulse responses of the transmission line can not be limited to v+1 effectively due to actual limitation of the number of taps to an ADSL class even if the number of taps of the TEQ should be increased along with the increase of the number of the subchannels, and because an amount of calculation is also increased as the subchannel and the sampling rate are increased in an initializing step.

SUMMARY OF THE INVENTION

The object of the present invention designed to solve above problems in the prior art is to provide a TEQ of serial dual filter in a VDSL transmission system, in which entire signal band is divided into a low frequency band and a high frequency band, optimal values of TEQs for respective signal bands are obtained, and the two TEQs are connected in series, for carrying out a function of a TEQ for an entire signal band.

Other object of the present invention is to provide a TEQ of serial dual filter in a VDSL transmission system, in which the low frequency signal band is set identical to a band an ADSL transmission system uses, a portion of IFFT and a Fourier transform block are used in modulation and demodulation, not only for maintaining an ADSL interchangeability with easy, but also for saving hardware to save power consumption.

Another object of the present invention is to provide a TEQ of serial dual filter in a VDSL transmission system, in which an initializing is carried out after an entire signal band is divided into a plurality of signal bands, for reducing hardware required for obtaining optimal values of respective TEQs, and connecting the TEQs of different signal bands obtained in the initializing in series for obtaining an accurate frequency response of a desired band.

These and other objects and features of the present invention can be achieved by providing a method for designing TEQs(Time-domain Equalizers) for different signal bands in a VDSL transmission system, including the steps of dividing an entire signal band into at least two signal bands, and respectively modulating the divided signal bands before transmission at a transmitter, and applying respective transmitted signal bands to an algorithm that can reduce channel response lengths of the respective signal bands at a receiver, for obtaining respective TEQs.

Preferably, the entire signal band is divided into a low frequency signal band and a high frequency signal band, wherein the low frequency signal band is allocated smaller than the high frequency signal band.

More preferably, the low frequency band is over sampled, and transmitted at the transmitter, and the low frequency signal band TEQ is obtained at the receiver after down sampling the over sampled signal.

More preferably, the low frequency signal band is over sampled by 'k' times(k=N/m) (where, N/2 denotes a number of entire subchannels, and m/2 denotes a number of subchannels used) at the transmitter, and a received signal is 'k' times down sampled at the receiver.

More preferably, a number of the subchannels of the low frequency signal band is 256, and the low frequency signal band TEQ is matched with an ADSL transmission system.

In other aspect of the present invention, there is provided a device for designing TEQs for different signal bands in a VDSL transmission system, the device for dividing an entire signal band of the VDSL transmission system into at least two signal bands, and obtaining TEQs for respective signal bands, including Fourier transform blocks for modulating respective signal bands, a digital to analog converter for converting the modulated signal bands into analog and transmitting through a channel, an analog to digital converter for digitizing the analog signal transmitted through the channel, and means for applying the digital signal to an algorithm for reducing a length of a channel impulse response, for obtaining the TEQs for the different signal bands.

Preferably, the entire signal band is divided into a low frequency signal band and a high frequency signal band, wherein the low frequency signal band is allocated smaller than the high frequency signal band.

More preferably, the device further including an over sampling means for over sampling the modulated signal band for the low signal band, and providing to the digital to analog converter, and a down sampling means for down sampling the over sampled signal converted at the analog to digital converter into an original signal.

More preferably, the over sampling means over samples the signal band by 'k' times(k=N/m)(where N/2 is a number of entire subchannels, and m/2 is a number of subchannels in the low frequency band), and the down sampling means down samples a received signal by k times.

More preferably, the Fourier transform block is divided into a plurality of partial Fourier transform blocks, and the low frequency signal band is modulated by using a portion of Fourier transform blocks among the plurality of the partial Fourier transform blocks.

In another aspect of the present invention, there is provided a method for designing a TEQ in a VDSL transmission system, including the steps of dividing an entire signal band in the VDSL transmission system into at least two signal bands, obtaining the TEQs for respective signal bands, and connecting the TEQs for respective signal bands in series in a time domain.

Preferably, in the step (1), the entire signal band is divided into a high frequency signal band and a low frequency signal band, wherein the low frequency signal band is allocated smaller than the high frequency signal band.

More preferably, in the step (2), respective signal bands are applied to an algorithm for reducing a length of a channel impulse response, for obtaining the TEQs for respective signal bands.

More preferably, the low frequency signal band TEQ has a 256 subchannels, and the low frequency signal TEQ is matched with an ADSL transmission system.

In further aspect of the present invention, there is provided a TEQ in a VDSL transmission system including TEQs for different signal bands connected in series, the different signal bands being divisions of an entire signal band.

Preferably, the TEQ includes a high frequency signal band TEQ and a low frequency signal band TEQ connected in series.

More preferably, the high frequency signal band TEQ and the low frequency signal band TEQ are obtained by applying respective signal bands to an algorithm which can reduce a channel impulse response length.

More preferably, the low frequency signal band TEQ includes shift registers connected between taps for reducing data loss.

BRIEF DESCRIPTION OF THE DRAWINGS

The embodiments of the present invention will be explained with reference to the accompanying drawings, in which.

DETAILED DESCRIPTION OF THE INVENTION

Figure 1:
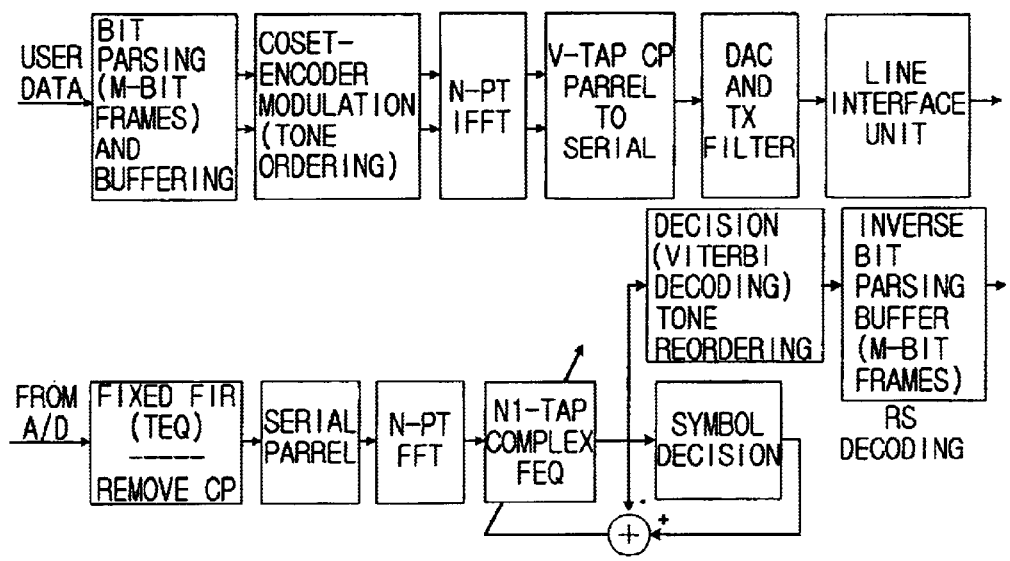
FIG. 1 illustrates a functional block diagram showing a transmitter and a receiver of a general DMT modulation/demodulation type transmission system.
Figure 2:
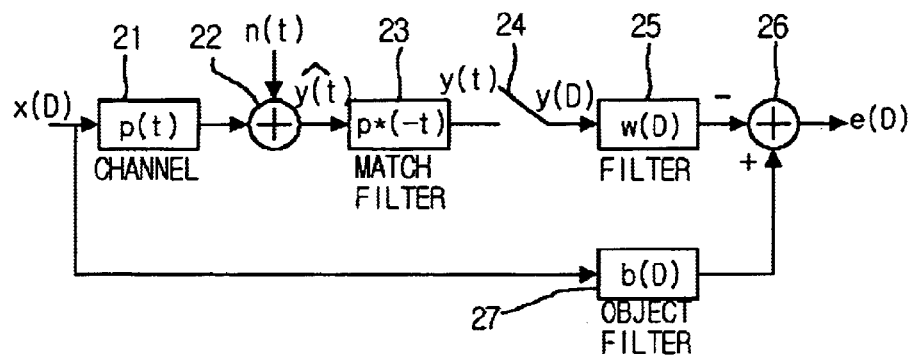
FIG. 2 illustrates a functional block diagram showing a system of the time-domain equalizer used in the transmission system in FIG. 1.

A time-domain equalizer of serial dual filter in a VDSL transmission system in accordance with a preferred embodiment of the present invention will be explained in detail with reference to the attached drawings.

A DMT modulation/demodulation type VDSL transmission system takes much time significantly for initialization in comparison to an ADSL transmission system due to many subchannels. However, since endurance of one symbol is fixed to 250 μs for both of the transmission systems, the TEQ operative at a sampling clock speed should be operated at a fast speed there are more subchannels, like the VDSL transmission system. The sampling clock speed may be expressed as "(a number of the subchannels+a number of cyclic prefix) x symbol speed". The number of the cyclic prefix is increased in proportion to the number of the subchannels. For example, the VDSL transmission system having a number of subchannels 16 times more than the ADSL transmission system(256 subchannels, and 40 cyclic prefix) has 4096 subchannels and 640 cyclic prefix.

Though physical time interval a channel has is fixed, a number of samples of digital equivalent channel is varied with a sampling rate. That is, even if a channel used in the ADSL transmission system and a channel used in the VDSL transmission system are identical, at the end, the digital equivalent channel used in the VDSL transmission system has more impulse responses because the sampling rate of the VDSL transmission system is higher. Accordingly, a quantitative TEQ complexity of the VDSL transmission system is increased by a number of increased subchannels compared to the ADSL transmission system.

However, a length of an impulse response is not increased in proportion to the sampling rate because in general a power of channel impulse response is concentrated on a main lobe, and a relative importance of power of the main lobe is increased in proportion to the increased number of samples. This effect permits the VDSL transmission system to use the TEQ having a smaller importance relative to the ADSL transmission system. In detail, in a case of the VDSL transmission system, though the cyclic prefix increases identical to an increase of the subchannels compared to the ADSL transmission system, the impulse response length of channel the cyclic prefix should bear increases less compared to the increase of the subchannels, that leads the cyclic prefix in the VDSL transmission system to work more than the cyclic prefix in the ADSL transmission system, resulting the TEQ to work relatively less, which permits to obtain the same effect by using less hardware at the end. In an extreme case, the VDSL transmission system having 4096 subchannels can obtain a certain extent of performance even if no TEQ is used.

However, in order to meet a performance requirement of the rule, and to maintain the interchangeability with the ADSL transmission system, at least it is inevitable to use the TEQ in a class used in the ADSL transmission system. Accordingly, the present invention suggests to use the TEQ used in the VDSL transmission system in a low frequency signal band at which an ADSL interchangeability is required, and to use the TEQ with a small number of taps a VDSL signal band other than the low frequency signal band, for solving the problems of the ADSL interchangeability as well as the performance drop.

Figure 3:
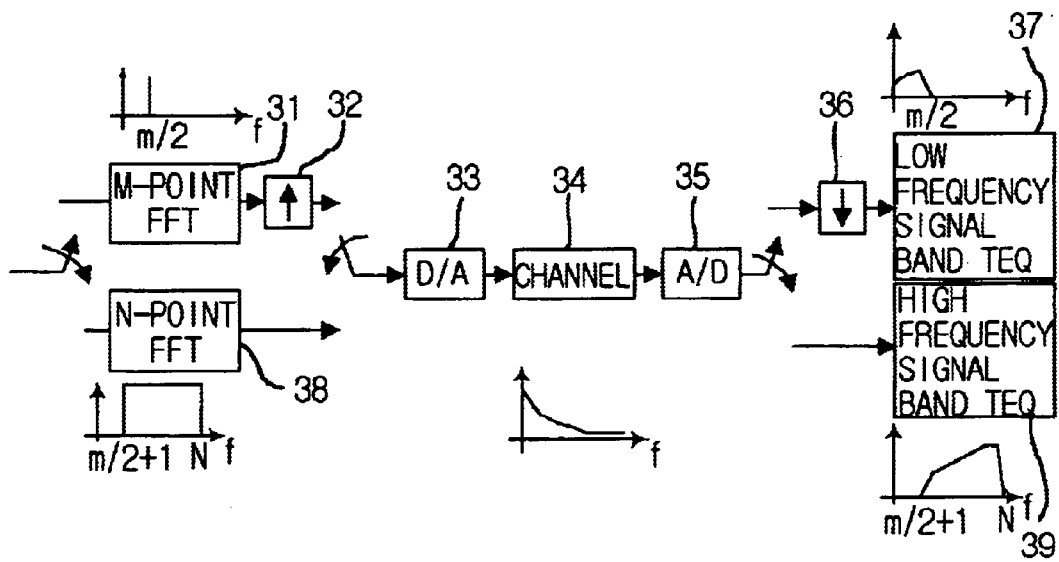
FIG. 3 illustrates a flow showing the steps of a process for obtaining an initial value of a TEQ in accordance with a preferred embodiment of the present invention.
Figure 4:
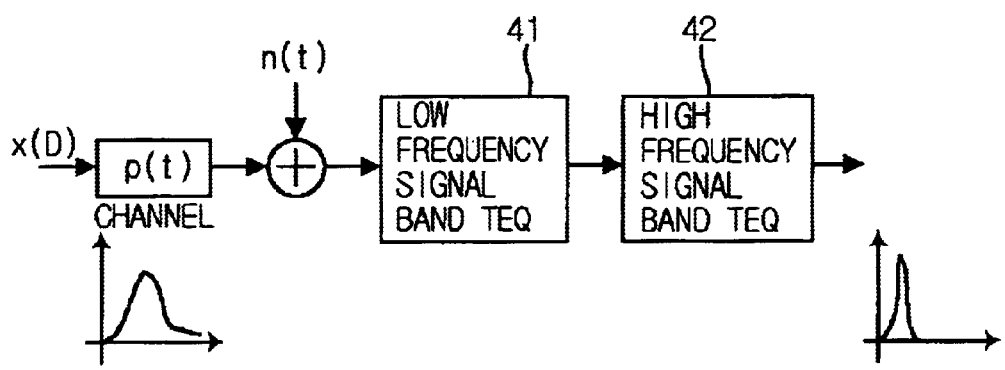
FIG. 4 illustrates a block diagram of a TEQ of a serial dual filter in accordance with a preferred embodiment of the present invention.

Though the low frequency signal band shows a very small signal reduction by the channel, the signal reduction greatly affects the data transmission performance despite of the small reduction. As shown in FIG. 3, in the present invention, two TEQs for the low frequency signal band and the high frequency signal band are obtained, and, as shown in FIG. 4, the two TEQs are connected in series in a time domain, for obtaining an effect of multiplication in a frequency domain. In this instance, the low frequency signal band TEQ is calculated accurately by using all required taps of the linear filter, and the high frequency signal band TEQ is calculated a little less accurately compared to the required taps for reducing a hardware complexity. Even if the high frequency signal band TEQ is calculated a little less accurately, the little less accurate calculation will not be a great performance drop factor, because the cyclic prefix compensates for most of the ISI caused by the channel in a case many cyclic prefix is used and a channel power is concentrated on a comparatively small time domain.

Referring to FIG. 3, methods for obtaining the low frequency signal band TEQ and the high frequency signal band TEQ will be explained. An entire signal band is divided into a low frequency signal band and a high frequency signal band, and the low frequency signal band TEQ is obtained at first and the high frequency signal band TEQ is obtained thereafter. In order to carry out such an operation, at first a transmission part modulates data on the low frequency signal band in the entire signal band 31.

In this instance, in a case of the VDSL transmission system using N/2 subchannels, only m/2 subchannels, a part of the N/2 channels, are used, and in order for the low frequency signal band TEQ to maintain an interchangeability with the ADSL transmission system, 256 subchannels are used. A time domain signal having m samples provided as a result of the modulation is 'k'(k=N/m) times over sampled 32 and subjected to digital to analog conversion 33. The 'k' times over sampling is made because of the following reasons. First, in a case of converting a sampled digital signal into an analog signal, since a signal identical to an original signal is duplicated at a frequency position falling on an integer time of the sampling frequency, it is difficult to obtain the high frequency signal band TEQ, that will be carried out later, unless the over sampling is not done, because the duplicated signals are present within the high frequency signal band. Second, unless the over sampling is not done, a high precision analog low pass filter is required for extracting the original signal because a distance between the original signal and the duplicated signal.

As shown in FIG. 3, the signal digital to analog converted is passed through a channel 34, converted into a digital signal at the analog to digital converter 35 again, and 'k' down sampled 36 again, and provided to the low frequency signal band TEQ. Then, an algorithm for reducing the length of the channel response is used for obtaining the low frequency signal band TEQ. In this instance, the hardware complexity is proportional to the number of subchannel used in the data transmission at the transmission part, and, if 256 subchannels are used, the hardware complexity is the same with the TEQ used in the ADSL transmission system.

In the process of obtaining the low frequency signal band TEQ, the IFFT at the transmitter, and the FFT at the receiver are required to carry out conversion for only m points(m= N/k). Therefore, as shown in FIG. 3, an m point Fourier transform block is repeatedly provided for providing the N point Fourier transform block. And, when the low frequency band TEQ is required, only one of the m point Fourier transform blocks is used, leaving the rest of the m point Fourier transform blocks are idle, for reducing hardware and an amount of calculation.

After the low frequency signal band TEQ is obtained thus, the transmission part modulates a data in the high frequency signal band 38, converts an N time domain signal, which is a resultant of the modulation, into an analog signal at the digital to analog converter 33, and transmits to the channel 34. In the reception part, a signal received through the channel 34 is converted into a digital signal, and is provided to the high frequency signal band TEQ 39. Then, an algorithm for reducing an impulse response length of the channel is used, to obtain the high frequency signal band TEQ.

Referring to FIG. 4, the TEQ in the VDSL transmission system of the present invention includes the low frequency signal band TEQ 41 and the high frequency signal band TEQ 42 connected in series, which are obtained through the aforementioned process. This provides an effect that the two TEQs 41 and 42 are convoluted in a time domain, and have transmission functions thereof multiplied in a frequency domain. In this instance, sampling rates of the low frequency signal band TEQ and the high frequency signal band TEQ have a 'k' times difference.

Figure 5:
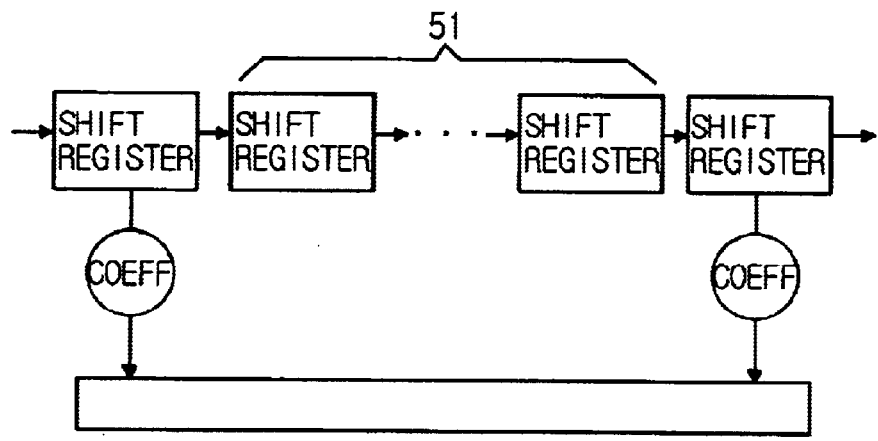
FIG. 5 illustrates a block diagram of the low frequency signal band TEQ shown in FIG. 4; and, FIG. 6 illustrates a block diagram of the high frequency signal band TEQ shown in FIG. 4.
Figure 6:
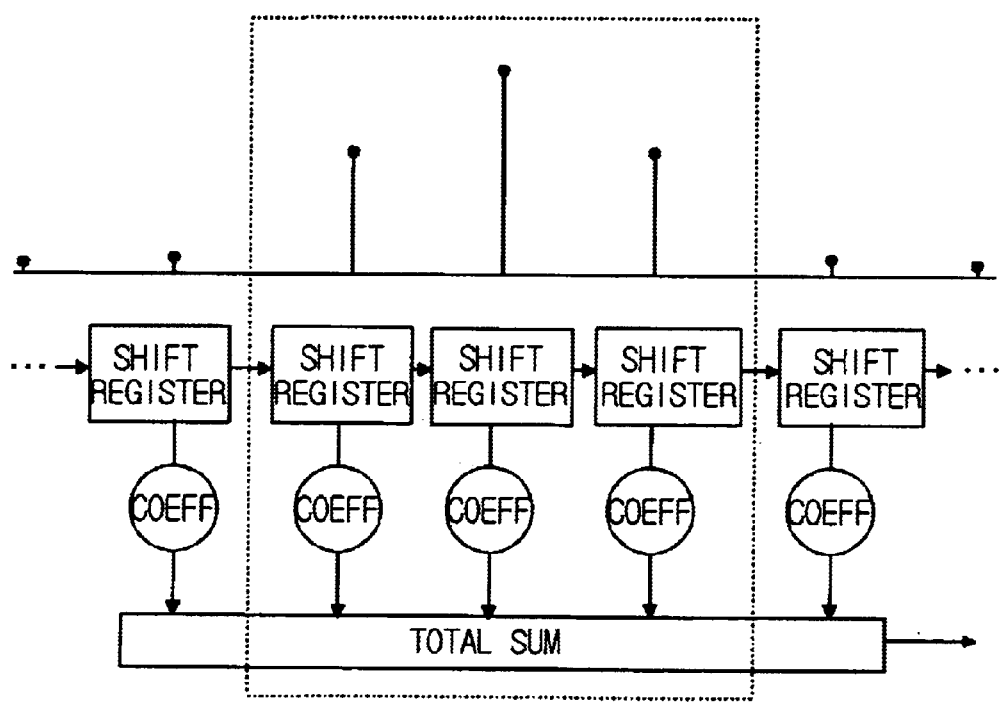

As shown in FIG. 5, in order to compensate for the 'k' times difference, the low frequency signal band TEQ has (k−1) shift registers 51 between taps, with each of the shift registers made operative at the same speed with the high frequency signal band TEQ. The (k−1) shift registers 51 prevent a high rate data passing through the low frequency signal band TEQ from being damaged. In this instance, an effect adding '0' between each of adjacent samples of the low frequency signal band TEQ is provided, which in turn provide the effect of 'k' time over sampling. According to this, a bandwidth of the low frequency signal band TEQ is reduced by 'k' times.

However, since an incoming data rate is increased by 'k' times compared to the initializing step for obtaining the low frequency signal band TEQ, the signal band reduced by 'k' times is increased to 'k' times again, to restore an original form.

The low frequency signal band of the TEQ in the VDSL transmission system of the present invention is identical to the signal band used in the ADSL transmission system. That is, by putting m=512, the VDSL transmission system of the present invention can be made interchangeable with the ADSL transmission system merely by idling the high frequency signal band TEQ, without addition of separate hardware even in a case an interchangeability with the ADSL transmission system is required.

And, though the entire signal band is divided into two signal bands in the aforementioned embodiment, the present invention is not limited to this, but, if the entire signal band may be divided into a plurality of signal bands, a TEQ for each signal band is obtained, and the obtained TEQs(linear filters) are connected in series considering operation speeds appropriately, a TEQ which can express a particular band accurately on the whole can be provided, with a simple hardware.

The time-domain equalizer of serial dual filter in a VDSL transmission system has the following advantages.

First, when many subchannels are used like the case of the TEQ in the VDSL transmission system compared to a general TEQ, an amount of hardware can be reduced significantly.

Second, the employment of a precision TEQ for a low frequency signal band for minimizing drop of performance can compensate the low frequency signal band, which carries comparatively important information, perfectly.

Third, the TEQ of the ADSL transmission system can be used without addition of separate hardware or a complicate operation.

Fourth, if the entire band is divided, not limited to a low frequency band and a high frequency band, but into a plurality of frequency bands, a TEQ which has an accurate frequency response for any desired band can be provided.

Fifth, in a case when a desired performance can be obtained only with cyclic prefix without using the TEQ in the VDSL transmission system, when only the low frequency signal band TEQ is used without using the high frequency signal band TEQ, the hardware essential for the interchangeability with the ADSL transmission system can be utilized in the VDSL transmission system, thereby improving performance without increased hardware.

Although representative embodiments of the present invention have been disclosed for illustrative purposes, those who are skilled in the art will appreciate that various modifications, additions and substitutions are possible without departing from the scope and spirit of the present invention as defined in the accompanying claims and the equivalents thereof.

What we claim:

1. A method for designing TEQs_(Time-domain Equalizers) for different signal bands in a VDSL transmission system, comprising the steps of:

dividing an entire signal band into at least one low frequency signal band and one high frequency signal band, and respectively modulating the divided signal bands before transmission at a transmitter; and applying respective transmitted signal bands to an algorithm that can reduce a length of a channel impulse response at a receiver, for obtaining the TEQs for respective signal bands, wherein the low frequency signal band signal is over sampled by 'k' times (k=N/m) (where N/2 denotes the number of entire number of sub-channels in the VDSL transmission system, and m/2 denotes the number of sub-channels used) at the transmitter before transmitting, and the over sampled signal is 'k' times down sampled at the receiver before it applied to the algorithm.

2. The method of claim 1, wherein the number of the low frequency signal band is one.

3. The method of claim 2, wherein the number of the sub-channels of the low frequency signal band is 256 so that the low frequency signal band is matched with frequency signal band of ADSL transmission system.

4. A device for designing TEQs for different signal bands in a VDSL transmission system, the device for dividing an entire signal band of the VDSL transmission system into at least one low frequency signal band and one high frequency signal band, and obtaining TEQs for respective signal bands, the device comprising:

fourier transform blocks for modulating respective signal bands;

an over-sampling means for over sampling signals on the modulated signal band for the low frequency signal band and providing over-sampled signals to a digital-to-analog converter;

a digital-to-analog converter for converting signals on the modulated signal bands into analog signals and transmitting through a channel;

an analog-to-digital converter for converting the analog signals transmitted through the channel into digital signals;

a down-sampling means for down sampling the over-sampled signals converted at the analog-to-digital converter into an original signal; and means for applying the digital signals to an algorithm for reducing a length of a channel impulse response to obtain the TEQs for the different signal bands, wherein the over-sampling means over samples signals on the signal band by 'k' times (k=N/m) (where N/2 is the number of entire sub-channels in the VDSL transmission system, and m/2 is the number of sub-channels used), and the down sampling means down samples the over-sampled signals by 'k' times before they applied to the algorithm.

5. The device of claim 4, wherein the number of the low frequency signal band is one.

6. The device of claim 4, wherein the Fourier transform block is divided into a plurality of partial Fourier transform blocks, and the low frequency signal band is modulated by using a portion of Fourier transform blocks among the plurality of the partial Fourier transform blocks.

7. A method for designing a TEQ in a VDSL transmission system, comprising the steps of:

dividing an entire signal band in the VDSL transmission system into at least one low frequency signal band and one high frequency signal band;

obtaining the TEQs for respective signal bands comprising;

first step of respectively modulating the divided signal bands before transmission at a transmitter; and second step of applying respective transmitted signal bands to an algorithm that can reduce a length of a channel impulse response, for obtaining the TEQs for respective signal bands, wherein the low frequency signal band signal is over sampled by 'k' times (k=N/m) (where, N/2 denotes the number of entire number of sub-channels, and m/2 denotes the number of sub-channels used) at the transmitter before transmitting, and the over sampled signal is 'k' times down sampled at the receiver before it applied to the algorithm; and connecting the TEQs for respective signal bands in series in a time domain.

8. The method of claim 7, wherein the low frequency signal band TEQ has 256 sub-channels so that and the low frequency signal band is matched with a frequency signal band of an ADSL transmission system.

9. A VDSL transmission system comprising at least two TEQs, said TEQs designed by the method of claim 7.

* * * * *